June 28, 1927.
J. J. SCHLOSSER
1,633,680
TEMPERATURE CONTROL
Filed Feb. 2, 1926
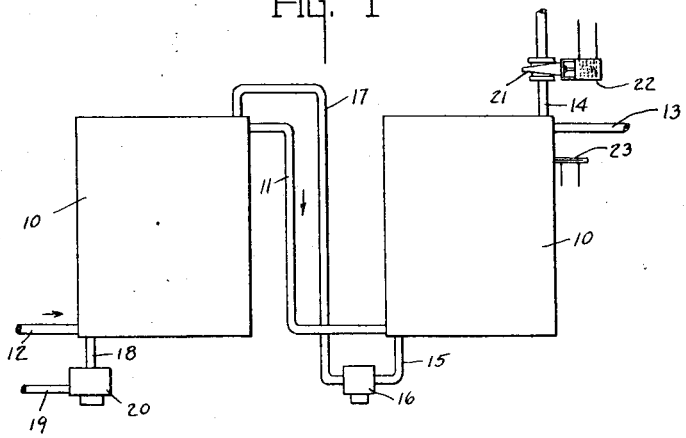
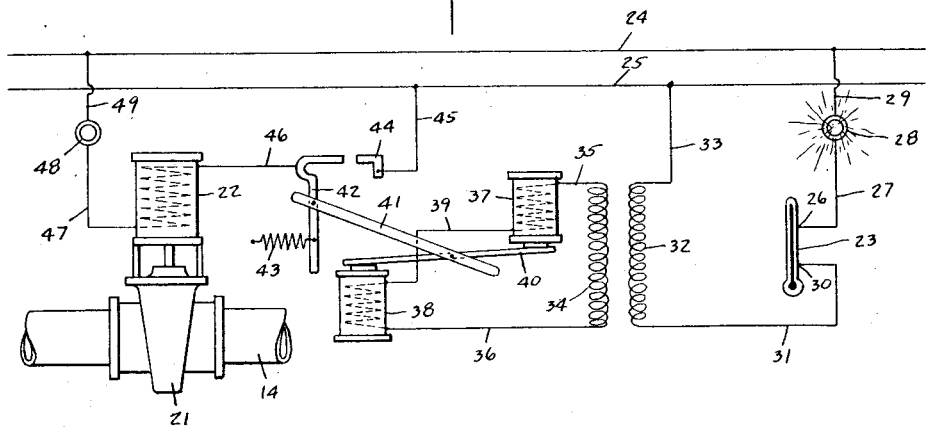
INVENTOR.
JOHN J. SCHLOSSER.
BY
ATTORNEYS.

Patented June 28, 1927.

1,633,680

UNITED STATES PATENT OFFICE.

JOHN J. SCHLOSSER, OF FRANKFORT, INDIANA, ASSIGNOR TO SCHLOSSER BROTHERS, OF FRANKFORT, INDIANA, A CORPORATION.

TEMPERATURE CONTROL.

Application filed February 2, 1926. Serial No. 85,529.

This invention relates to a Pasteurizer or the like and a thermostatic control therefor, whereby the temperature therein is maintained at a predetermined temperature.

The chief feature of the invention consists in the provision of means for supplying heat to a Pasteurizer compartment or container, and associated therewith a controller mechanism for maintaining said compartment or the like at a predetermined temperature, below which the temperature will not fall and above which the temperature will not rise appreciably.

The chief feature of the invention consists in the association of heat supplying means, a power circuit controlling the same and a pilot circuit for controlling the power circuit and thermally responsive to temperature conditions whereby automatic control of the power circuit is secured.

The full nature of the invention will be understood from the accompanying drawings and the following description and claims:

In the drawings Fig. 1 is an elevational view of a mechanism showing the several lines connected thereto and the immediate control means associated therewith. Fig. 2 is a wiring diagram of the control circuit and the parts immediately associated with the apparatus shown in Fig. 1.

This invention is an improvement upon that basicly disclosed in the copending application entitled Thermostatic control, Serial No. 43,283, dated July 13, 1925, and assigned to the assignee of this application.

In the drawings 10 indicates a Pasteurizer chamber to which is connected another pasteurizer chamber 10 by a line 11 leading from the top of the first to the bottom of the second. A supply line 12 and a discharge line 13 are connected respectively to the bottom of the first Pasteurizer chamber and to the top of the second Pasteurizer chamber. A heat supply line 14 is connected to the top of the second Pasteurizer and the heat supply means is connected by a discharge line 15 to a suitable trap 16, and from thence by line 17 to the first Pasteurizer, from which it discharges through a line 18 to the discharge line 19 by way of the trap 20. The foregoing arrangement is what is commonly called reverse flow, that is, the milk to be Pasteurized flows in one direction through the Pasteurizer, and the steam for heating or Pasteurizing flows in the opposite direction, thus bringing the hottest steam to the hottest milk, so that the heat exchange is affected most economically throughout the two Pasteurizers since a relatively larger temperature difference is possible by this arrangement than by a reverse arrangement.

In the controlling line 14 is a valve 21 and controlling said valve 21 is a relay or magnet 22. Positioned adjacent the discharge 13 and responsive to the temperature of the discharged milk at this point is a thermally responsive mechanism in the form of a thermometer switch 23.

Reference will now be had to Fig. 2, wherein the control circuits are illustrated. It is to be understood that merely for convenience is the foregoing mechanism shown applied to a Pasteurizer construction, for the same may be applied to other structures such as culture cabinets, milk solids testers, etc. In Fig. 2 the two supply mains are indicated by the numerals 24 and 25, and herein the same are connected to a suitable source of alternating current. The thermometer 23 includes a terminal 26 connected by line 27 to a signal lamp 28, in turn connected by line 29 to supply line 24. The thermometer also includes a terminal 30 connected by line 31 to the primary winding 32 of a transformer, in turn connected by line 33 to the other supply line 25. By having this winding 32 of relatively high resistance it will be apparent that the current flowing through the pilot or control circuit herein described, is relatively small and thus the thermometer mechanism herein shown is perfectly adapted to open and close the circuit without dangerous effects such as arcing. Magnetically coupled to the primary winding is the secondary winding 34 of the transformer, and said winding is connected by lines 35 and 36 to the series connected relays 37 and 38 connected by a line 39. Thus the relay mechanism is in a closed circuit and in the secondary of the pilot or control circuit. Since the coils 37 and 38 are of relatively low resistance, the transformer is adapted to supply through the secondary winding a relatively low voltage, high amperage current for power purposes. When the thermometer circuit is closed the relays are actuated which tilts the armature 40 on its pivot 41. Pivot 41 consists of a rock shaft upon which is also mounted a switch member 42, so that switch member 42 is movable with the armature 40. The rock shaft, or rather the switch member 42 is normally maintained in closed circuit position by a spring 43. Switch member 42 is adapted to normally engage contact 44 connected by line 45 to one of the supply lines, to wit, line 25. Line 46 connects switch member 42 to the relay 22 connected by line 47 to a signal lamp 48, in turn connected by line 49 to the other supply line 24.

It will be noted that when the thermometer switch is closed the power switch is open and the thermometer switch indicating signal is energized, while the other signal is deenergized. Conversely when the thermometer circuit is open, that is the switch is open and the signal is deenergized, the power circuit switch is closed and the power circuit signal indicator is energized. Thus one of the indicating means is always energized, and since they are differentially operable indicate that the device is operative at all times. Failure of any of the indicators indicates that one portion of the circuit is inoperable. It will also be observed that in the present form of the invention the thermally responsive switch and the power switch are also differentially operable. When the temperature in the Pasteurizer attains a predetermined degree, the remote control circuit is closed through the thermometer switch. This energizes the series connected relays to open the power switch and deenergize the valve controlling relay 22 which deenergization of relay 22 causes closing of the valve 21. When the temperature falls by reason of the cutting off of the heat supply sufficient to open the circuit through the thermometer switch, the series connected relays are deenergized permitting spring 43 to close the power switch 42, thereby energizing the relay 22 which secures the opening of valve 21. Thus the power switch and the valve are differentially operable, while the valve and the thermometer switch are similarly operable. Closing of the thermometer circuit closes the valve and shuts off the heat supply and opening of the thermometer circuit opens the valve and secures the heat supply.

The invention claimed is:

1. In a heating system, the combination of a source of energy, a source of heat, a valve therefor, an electrical circuit connected to said source of energy and controlling the valve including a switch, another circuit connected to the source of energy and including a temperature responsive switch, and a third circuit magnetically connected to the last mentioned circuit and including means mechanically connected to said first mentioned switch for controlling the same, whereby said last mentioned circuit controls said first mentioned switch.

2. A device as defined by claim 1, characterized by the valve and first mentioned switch being differentially operable, and the switches being differentially operable and the valve and last mentioned switch being similarly operable.

3. In a heating system, the combination of a source of energy, an independent source of heat, a valve controlling the supply therefrom, an electrical circuit connected to the source of energy and controlling the valve including a switch, said switch and valve being differentially operable, and another circuit connected to the source of energy and including a temperature responsive switch for controlling said first mentioned switch, said circuits being differentially energized, a current energized indicating means in each circuit for indicating the operativeness of the circuit, said indicating means being alternately operable by reason of the differential energization of the circuits, whereby an indicating means is always energized for indicating the operativeness of the entire system.

In witness whereof, I have hereunto affixed my signature.

JOHN J. SCHLOSSER.